United States Patent
Hong et al.

(10) Patent No.: US 8,655,142 B2
(45) Date of Patent: Feb. 18, 2014

(54) APPARATUS AND METHOD FOR DISPLAY RECORDING

(75) Inventors: Joon Yong Hong, Gyeonggi-do (KR); Han Seung Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 1035 days.

(21) Appl. No.: 12/297,190

(22) PCT Filed: Apr. 16, 2007

(86) PCT No.: PCT/KR2007/001837
§ 371 (c)(1),
(2), (4) Date: Jan. 5, 2009

(87) PCT Pub. No.: WO2007/119996
PCT Pub. Date: Oct. 25, 2007

(65) Prior Publication Data
US 2009/0169175 A1    Jul. 2, 2009

(30) Foreign Application Priority Data

Apr. 14, 2006 (KR) .......... 10-2006-0034112
Jun. 14, 2006 (KR) .......... 10-2006-0053448

(51) Int. Cl.
*H04N 9/80* (2006.01)
*H04N 5/76* (2006.01)

(52) U.S. Cl.
USPC .......... 386/239; 386/248; 386/291

(58) Field of Classification Search
USPC .......... 386/291–299, 239–248
See application file for complete search history.

(56) References Cited

U.S. PATENT DOCUMENTS

| | | | |
|---|---|---|---|
| 6,040,850 A * | 3/2000 | Un et al. .......... | 725/68 |
| 2002/0019819 A1 | 2/2002 | Sekiguchi et al. | |
| 2002/0026540 A1 | 2/2002 | Smyers | |
| 2005/0125435 A1 | 6/2005 | Schoenberg | |
| 2005/0220440 A1 * | 10/2005 | Liebhold .......... | 386/68 |
| 2006/0010470 A1 | 1/2006 | Kurosaki et al. | |
| 2006/0206819 A1 * | 9/2006 | Tsuji et al. .......... | 715/716 |
| 2007/0280633 A1 * | 12/2007 | Nakamura et al. .......... | 386/68 |

FOREIGN PATENT DOCUMENTS

| | | |
|---|---|---|
| CN | 1331451 A | 1/2002 |
| CN | 1756301 A | 4/2006 |
| EP | 1549055 A1 | 6/2005 |
| EP | 1633173 A1 | 3/2006 |
| JP | 2002-7432 A | 1/2002 |
| JP | 2002-027382 A | 1/2002 |
| JP | 2002-218369 A | 8/2002 |
| JP | 2002-544593 A | 12/2002 |
| JP | 2003-163870 A | 6/2003 |

(Continued)

*Primary Examiner* — Hung Dang
(74) *Attorney, Agent, or Firm* — Birch, Stewart, Kolasch & Birch, LLP

(57) ABSTRACT

A method for displaying a record in an initial driving state of a record displaying apparatus is disclosed. The method includes searching execution/non-execution file descriptors of recorded multimedia files, and extracting record files not played back, and outputting a record file alarming message when a record file not played back is extracted. The record displaying apparatus is also disclosed. Execution/non-execution file descriptors of record files are searched upon system initialization of a broadcast receiver. When there is a new record or a record not played back, a record file alarming message is output in a state of being overlaid on a broadcast signal received. Accordingly, the user can access the record file list simultaneously with viewing a broadcast, without using any additional means.

17 Claims, 7 Drawing Sheets

(56) References Cited

FOREIGN PATENT DOCUMENTS

| | | |
|---|---|---|
| JP | 2003-319308 A | 11/2003 |
| JP | 2005-159579 A | 6/2005 |
| KR | 10-2003-0096799 A | 12/2003 |
| KR | 10-2004-0072145 A | 8/2004 |
| KR | 10-2004-0082603 A | 9/2004 |
| KR | 10-2005-0028327 A | 3/2005 |
| WO | WO 02/069636 A1 | 9/2002 |
| WO | WO 2004/019602 A2 | 3/2004 |
| WO | WO 2004/032491 A1 | 4/2004 |
| WO | WO 2006/033329 A1 * | 3/2006 ............ H04N 5/93 |

\* cited by examiner

| Title | Data | Time | Playback | Recording length |
|---|---|---|---|---|
| No title | 3/31(Fri) | PM 7:30 | N | 1hour |
| No title | 2/28(Tue) | PM 10:00 | N | 45minutes |
| No title | 2/14(Wed) | AM 11:00 | Y | 30minutes |
| No title | 12/12(Sun) | PM 9:50 | N | 15minutes |

APPARATUS AND METHOD FOR DISPLAY RECORDING

TECHNICAL FIELD

The present invention relates to an apparatus and method for displaying a new record, and more particularly, to a method for displaying a record alarming message upon operating a system initial screen when there is a program recorded, but viewed by the user, in a broadcast receiver having a digital video recorder (DVR) function.

BACKGROUND ART

Generally, a personal video recorder (PVR) includes a non-volatile storage built in a TV or a set-top box to record a broadcast signal or other input signal, and thus, to record a program, and to provide the recorded program to the user when the user desires to view the recorded program.

Recently, the domestic use of a digital broadcast receiver having a digital video recorder (DVR) function has increased. Such a digital broadcast receiver, which has a DVR function, stores a broadcast stream received from a broadcasting network in a hard disk included in the digital broadcast receiver, and outputs and plays back the stored broadcast stream at a time desired by the user.

In particular, the digital broadcast receiver can achieve reserved recording without using a separate recorder, by virtue of the DVR function thereof. Typically, reserved recording in a digital broadcast receiver having a DVR function is manually carried out in the unit of a program such a manner that the user designates respective recording time and channel information for programs to be recorded, through an electronic program guide (EPG).

Recently, in addition to the spread of digital broadcast receivers, a digital broadcast receiver DVR including a storage medium to record/reproduce digital broadcast data has been developed.

As the digital broadcasting is regularized, it is expected that such a DVR will rapidly substitute existing video cassette recorders (VCRs). The digital broadcast receiver DVR is equipped with a high-performance central processing unit (CPU) and uses a system in which digital broadcast programs are recorded in a storage medium such as a large-capacity hard disk drive (HDD) in the unit of a file. Thus, the digital broadcast receiver DVR has advantages in that it is possible to easily retrieve a desired one of the stored programs, and to simply and conveniently carry out repeated playback or editing of the retrieved program.

The digital broadcast receiver DVR also provides an EPG function, in order to provide an enhanced convenience to the user. The EPG may be considered to be similar to a table which appears on a newspaper to show the list of all programs to be broadcasted on the day of issue of the newspaper. The user can store the category, title, outline, etc. of a desired program, together with the program, upon recording or reserved-recording the program, using the EPG data.

In particular, the programs are classified into a high class, a middle class, and a low class in terms of category information, even though there may be a slight difference in the classification between different broadcasting companies. The category information of each program includes the feature information of the program.

Recording a broadcast program using a conventional digital broadcast receiver DVR is simple. That is, reserved-recording of a general program can be achieved by directly setting the time, at which the reserved-recording for the program is to begin, and the recording period, through a DVR remote controller, or setting the reserved-recording of the program, based on the EPG program data.

PVRs have a function for informing the user of the recorded objects in the form of a list that can be viewed by the user. However, when the user uses the reserved-recording function or does not view a recorded object immediately after the recording of the object, the identification of recorded objects should be carried out through the list of the recorded objects displayed in accordance with operation of the remote controller.

For this reason, it is necessary to provide a method enabling the user to easily recognize the existence of a new record and to easily access the record.

DISCLOSURE OF INVENTION

Technical Problem

An object of the present invention devised to solve the problem lies in providing a list of new records to the user when a personal video recorder (PVR) is powered on.

Another object of the present invention devised to solve the problem lies in providing a list of records not viewed by the user upon power-on.

Technical Solution

The object of the present invention can be achieved by providing a record displaying apparatus comprising: a user interface receiving a recording signal and a power supply signal from the user; a controller for creating a record file of video data and an execution/non-execution file descriptor in accordance with the recording signal, searching the execution/non-execution file descriptor of the record file in response to inputting of the power supply signal, and extracting the record file when the record file has not been executed; a hard disc for storing data information of the record file and the execution/non-execution file descriptor; and a video processor for outputting a alarming message for the extracted record file while overlaying the alarming message on a broadcast stream received.

The controller may comprises creation means for creating execution/non-execution file descriptors of record files, search means for searching for record files not played back, based on the created execution/non-execution file descriptors, and processing means for registering a list of the searched record files, and outputting a alarming message for the record files not played back.

The data information of the execution/non-execution file descriptor may be updated in accordance with execution of the record file.

The record file alarming message may include a lower item of information of the record file list.

The record file alarming message may include an icon function for execution of a direct access to the record file list.

The user interface may provide editing and deletion functions for the record file list in a state of being linked to the record file alarming message.

In another aspect of the present invention, provided herein is a video appliance which records and stores a video object, and displays various information in the form of message windows through a display, comprising: a storage medium for storing the record; and a recording processor for performing a control operation to display information as to addition of a new record stored before a main power is turned on, in the form of a message window when the main power is turned on.

In another aspect of the present invention, provided herein is a method for displaying a record in an initial driving state of a record displaying apparatus, comprising: searching execution/non-execution file descriptors of recorded multimedia files, and extracting record files not played back; and outputting a record file alarming message when a record file not played back is extracted.

The record file alarming message may be output when there is at least one new record file or at least one record file to be played back.

Each of the execution/non-execution file descriptors may be a record file extension inserted upon recording the associated multimedia file.

The searched files may be displayed in a file list in the order of later time.

The record file list may update information as to the execution/non-execution file description of a record file when the record file is played back.

The recorded multimedia files may be video and audio data.

The recorded multimedia files may be broadcast signal stream information.

The method may further comprise stopping outputting of the record file alarming message when a predetermined control signal is input during outputting of the record file alarming message.

The record file alarming message may contain information as to the record files not played back.

The information as to each record file not played back may include a file name of the record file, a broadcasting station name of the record file, a recording data and time of the record file, and information as to whether the record file is associated with immediate-recording or reserved-recording.

Advantageous Effects

In accordance with the present invention, the execution/non-execution file descriptors of record files are searched upon system initialization of the broadcast receiver. When there is a new record or a record not played back, a record file alarming message is output in a state of being overlaid on a broadcast signal received. Accordingly, the user can access the record file list simultaneously with viewing a broadcast, without using any additional means.

Also, it is possible to identify the use state of the hard disk and to provide file editing and deleting functions, by checking the record file list while linking the record file list to the record file alarming message, and thus, to achieve effective file management.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. In the following description of the present invention, a detailed description of known functions and configurations incorporated herein will be omitted when it may obscure the subject matter of the present invention.

Figure 1:
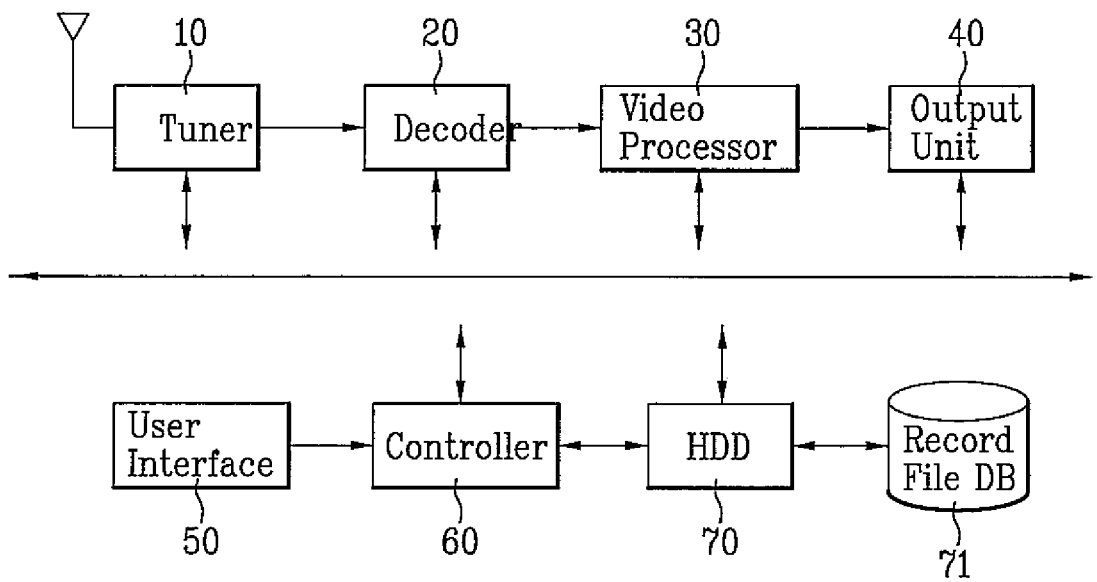
FIG. 1 is a block diagram illustrating a broadcast receiver having a digital video recorder (DVR) function in accordance with an embodiment of the present invention.

FIG. 1 is a block diagram illustrating a broadcast receiver having a digital video recorder (DVR) function in accordance with an embodiment of the present invention.

A tuner 10 receives a broadcast signal corresponding to a channel selected by the user, in response to a power supply signal. That is, the tuner 10 includes a register having a value set in accordance with the channel selected by the user, and receives a broadcast signal having a frequency band corresponding to the set value. The tuner 10 outputs a vestigial side band (VSB) signal or a quadrature amplitude modulation (QAM) signal which is a digital cable signal. The signal output from the tuner 10 is demodulated to a transport stream which is, in turn, split into video, audio, and data streams. The digital video signal output from the tuner 10 is temporarily stored in a buffer. Thus, broadcast signals are sequentially stored in a hard disk drive (HDD) 70.

A decoder 20 reads out a digital video signal compressed in an MPEG scheme from the HDD 70, and decodes the read-out digital video signal.

The decoded video signal is converted to an analog video signal by a video processor 30 which, in turn, outputs the analog video signal after overlaying the analog video signal on a data signal in an on-screen display (OSD) manner.

An output unit 40 synthesizes a record file alarming message with a broadcast signal, and outputs the resultant signal.

A user interface 50 receives a power supply signal, and calls a record file alarming message upon a system initialization, to access a list of record files to be played back.

A controller 60 detects a recording signal received from the user interface 50, and records a digital multimedia broadcast program, which is played back, in response to the detected recording signal. At this time, the controller 60 attaches an execution/non-execution-representing file descriptor to the recorded multimedia file. The execution/non-execution-representing file descriptor represents whether or not the multimedia file associated with the file descriptor was executed. When a record file is played back by the user, the execution/non-execution-representing file descriptor is updated, namely, it is changed to executed-record-file information.

The HDD 70 stores the recorded broadcast signal in a format of a transport stream (TS) or a packet elementary stream (PES). The HDD 70 also stores a recorded-file database including execution/non-execution-representing file descriptors.

In accordance with another embodiment, the present invention provides a video appliance which records and stores a video object, and displays various information in the form of message windows through a display. The video appliance includes a storage medium for storing the recorded video object, namely, a record, and a recording processor for performing a control operation to display information as to addition of a new record stored before the main power of the video appliance is turned on, in the form of a message when the main power of the video appliance is turned on.

Figure 2:
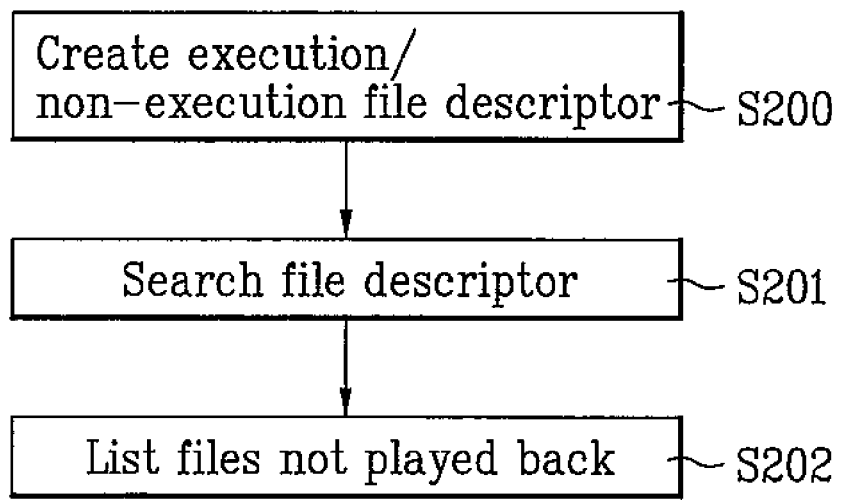
FIG. 2 is a flow chart illustrating the function of a record display included in a broadcast receiver according to the present invention.

FIG. 2 is a flow chart illustrating the function of a record display included in a broadcast receiver according to the present invention.

When a multimedia broadcast signal is recorded while being reproduced, an execution/non-execution-representing file descriptor is created as to a record file of the recorded multimedia broadcast signal. The file descriptor represents whether or not the playback of the record file has been executed. The file descriptor is indicated with "Y" when the record file has been executed, while being indicated with "N" when the record file has not been executed (S200).

A file descriptor search means extracts an execution/non-execution-representing file descriptor from the record file database stored in the HDD in an initial system-ON state in response to a system power supply signal input through the user interface. When there is a record file not executed, the controller outputs a record file alarming message while overlaying the message on a broadcast signal received on the current channel (S201).

Unexecuted record files searched by the file descriptor search means are listed in the order of later record time. The list of the unexecuted record files is provided in a state of being linked with the record file alarming message, as a lower item representing information as to record files to be played back by the user (S202). The record file list provides functions such as editing and deletion of a selected record file.

Figure 3:
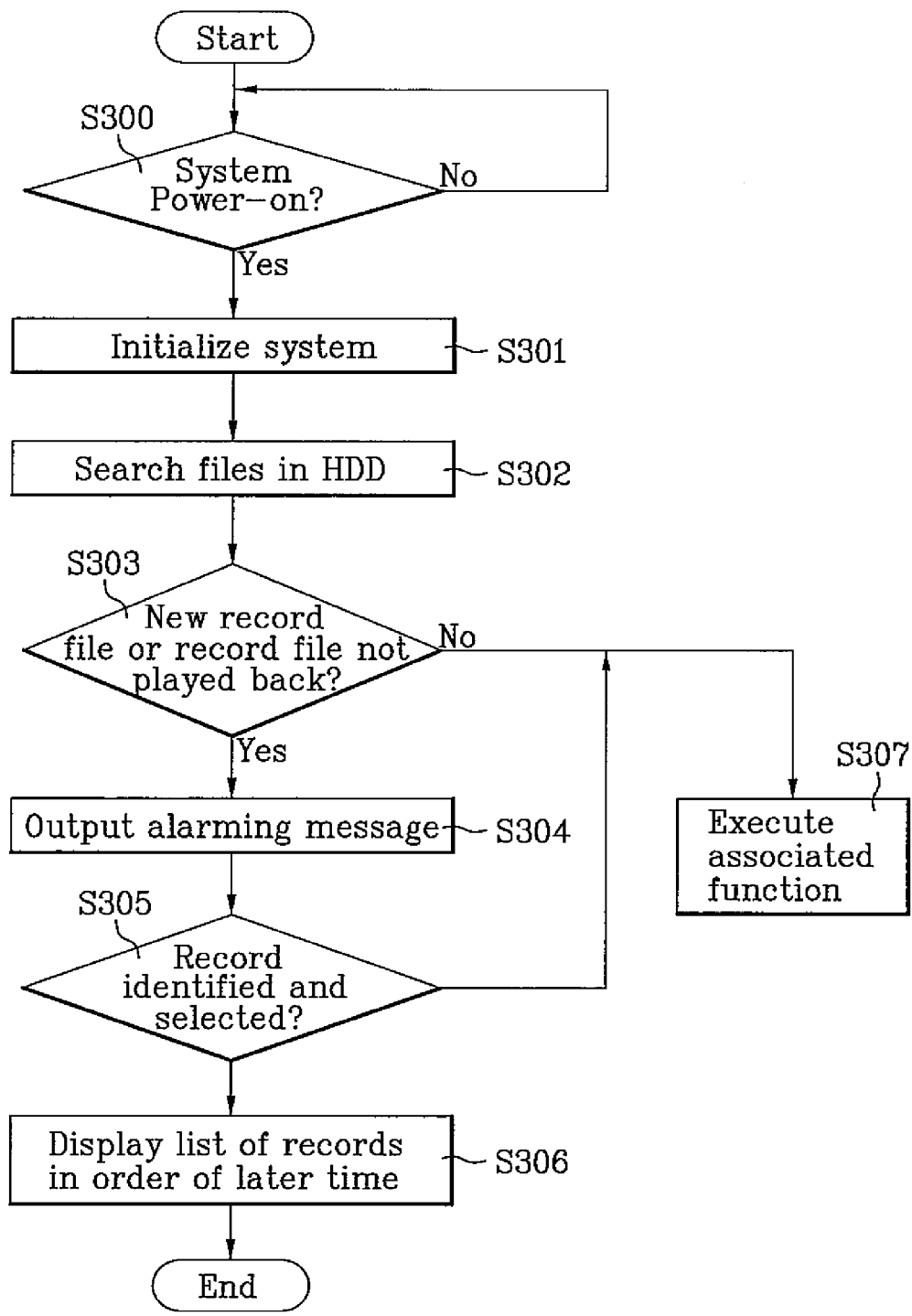
FIG. 3 is a flow chart illustrating a method for displaying a record in a system-initialized state of the broadcast receiver according to the present invention.

FIG. 3 is a flow chart illustrating a method for displaying a record in a system-initialized state of the broadcast receiver according to the present invention.

When a power supply signal input through the user interface is detected, the system of the broadcast receiver is initialized (S300, S301). The controller searches the record file database of the HDD for execution/non-execution file descriptors for record files (S302). New record files or record files not played back are detected based on the searched file descriptors (S303). When there is a new record file or a record file not played back, a record file alarming message is output to a screen display while being overlaid on a broadcast signal received on the current channel (S304). The controller receives a record identification signal linked with the alarming message, through the user interface (S305), and displays the list of record files stored in the order of later recording time (S306). When there is no new record file or no record file not played back, or there is no record identification signal input through the user interface, upon a system initialization, the broadcast receiver outputs a broadcast signal and executes the function of a signal input through the user interface (S307).

Figures 4, 5:
FIG. 4 is a schematic view illustrating a list of record files and execution/non-execution file descriptors according to an embodiment of the present invention.
FIG. 5 is a schematic view illustrating a broadcast signal and a record alarming message displayed on the screen of the broadcast receiver in accordance with an embodiment of the present invention.

FIG. 4 is a schematic view illustrating a list of record files and execution/non-execution file descriptors according to an embodiment of the present invention.

FIG. 4 shows a database containing a list of record files stored in the HDD of the broadcast receiver and execution/non-execution file descriptors indicated by "N" or "Y". The title of each record file may be input through the user interface. When the title of each record file is automatically stored, it may be stored in the form of numerical information which may be automatically updated. The storing dates of record files are listed in the order of later time. When the system is initialized, record files associated with an execution/non-execution file descriptor of "N" are detected. The record file list contains information as to recording time, recording length, etc.

FIG. 5 is a schematic view illustrating a broadcast signal and a record alarming message displayed on the screen of the broadcast receiver in accordance with an embodiment of the present invention.

When the broadcast receiver receives a power supply signal, it performs a system initialization, processes a broadcast signal received on the current channel (for example, Channel 7), and outputs the processed broadcast signal. At this time, the broadcast receiver searches the record file database of the HDD for execution/non-execution file descriptors. When there is a record file to be played back, the broadcast receiver displays a record file alarming message while overlaying the record file alarming message on the broadcast signal. The record file alarming message may be output in accordance with various outputting methods set in a user menu, in the form of a specific alarming audio signal or text flickering.

Figure 6:
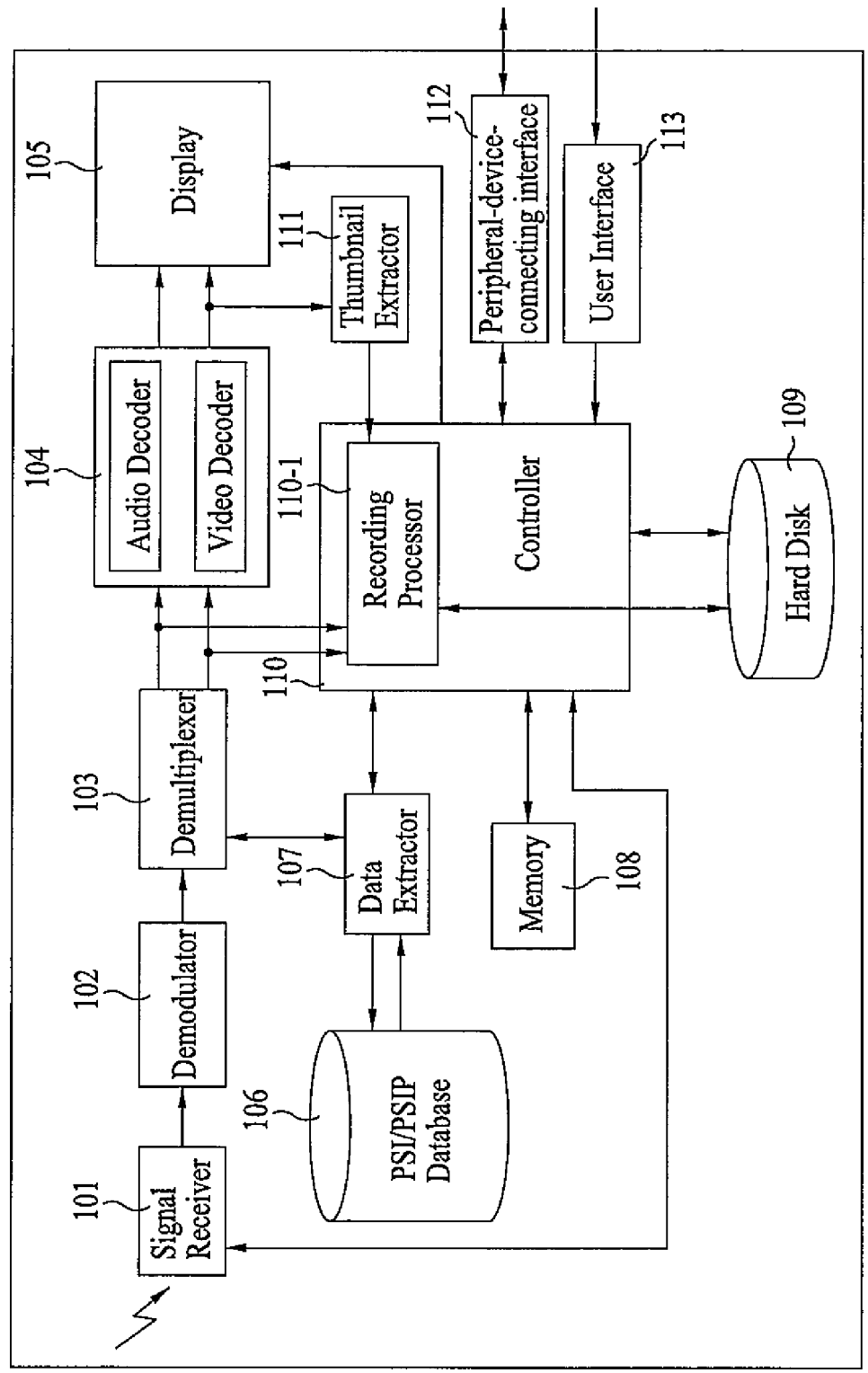
FIG. 6 is a block diagram illustrating an internal configuration of a broadcast receiver including a recording processor according to another embodiment of the present invention.

FIG. 6 is a block diagram illustrating an internal configuration of a broadcast receiver including a recording processor according to another embodiment of the present invention.

The broadcast receiver of the present invention may store a certain video object, and may include a large-capacity storage medium to store the video object. For the large-capacity storage medium, a hard disk, a magnetic recording tape, or a flash memory may be used. The large-capacity storage medium may not be built in the broadcast receiver. If necessary, the large-capacity storage medium may be mounted to or connected to the broadcast receiver.

The video object (or record), which can be stored by the broadcast receiver, means a combination of various video signals and audio signals including a broadcast program contained in a broadcast signal received on a cable channel or a radio channel. The video object may be a digital form or an analog form. The following description will be given in conjunction with a broadcast receiver which can store a digital video object in a hard disk or a large-capacity memory device.

The broadcast receiver of FIG. 6 may be a set-top box, a digital television (DTV), a personal video recorder (PVR), or a built-in PVR TV system. For the convenience of explanation, the following description will be given in conjunction with the case in which the record obtained by a recording or reserved-recording operation of the broadcast receiver is a broadcast program contained in a digital broadcast signal. The broadcast receiver of FIG. 6 is illustrated in association with a built-in PVR TV system. The following description will be given in conjunction with FIG. 6.

The broadcast receiver can receive a digital broadcast signal transmitted from a specific broadcasting station in accordance with a control command from the user, can store the received digital broadcast signal in a certain storage medium, and can reproduce the stored broadcast signal. Where a certain record has been stored in the storage medium before the current state in which main power is turned on, the broadcast receiver displays the fact that a new record has been stored (or added). Thus, the user is informed of the fact that a new video object has been recorded.

Here, "main power" means DC power supplied to the overall circuit of the broadcast receiver to enable the overall operation of the broadcast receiver in accordance with an operation of the user to operate a remote controller or a switch, or to execute program control. The user can enable the broadcast receiver to execute all operations including recording/playback by turning on the main power. The power state disabling execution of operations other than an operation to be executed in accordance with a reserved command generated by the user or a certain program, for example, a reserved recording operation, is referred to as a "standby power" state.

Referring to FIG. 6, the broadcast receiver of the present invention includes a signal receiver 101, a demodulator 102, a demultiplexer 103, an audio/video (A/V) signal processor 104, a display 105, a program specific information/program and system information protocol (PSI/PSIP) database 106, a data extractor 107, a memory 108, a hard disk 109, a controller 110, a recording processor 110-1, a thumbnail extractor 111, and a peripheral-device-connecting interface 112, and a user interface 113.

The signal receiver 101 tunes the frequency of a specific channel, and receives a digital broadcast signal containing an MPEG transport stream (TS).

The demodulator 102 demodulates the broadcast signal received by the signal receiver 101, and outputs the demodulated signal to the demultiplexer 940.

The demultiplexer 940 splits the demodulated broadcast signal into a video signal, an audio signal, and a data signal. The video and audio signals are sent to the A/V signal processor 104 which, in turn, decodes the video and audio signals.

The controller 110 controls the overall procedure for reproducing and storing the received broadcast signal. That is, when a storage select signal is input, the controller 110 performs a control operation to store the received broadcast signal in the hard disk 109 of the broadcast receiver or in an external storage.

The user interface 113 receives a select signal input from the user. For example, a recording request signal, a power-on/off signal for the broadcast receiver, an application drive signal, or a select signal is input. The user interface 113 also receives a signal associated with storage or playback.

The peripheral-device-connecting interface 112 is a connection path to an external storage to store a recorded program contained in the received broadcast signal in the external storage. The peripheral-device-connecting interface 112 is selectively present in the broadcast receiver.

The thumbnail extractor 111 extracts a thumbnail image which means a specific frame of a video displayed in a size smaller than the original size thereof. The thumbnail extractor 111 receives an output from the A/V signal processor 104, extracts a thumbnail image from the received signal, and stores the extracted thumbnail image in the hard disk 109 via the recording processor 110-1.

The demultiplexer 103 separates an AV stream and data for data broadcasting from the received digital broadcast signal, and outputs the separated stream and data.

The PSI/PSIP database 106 stores the data for data broadcasting extracted from the broadcast signal. The data for data broadcasting includes PSIP, PSI, etc.

The PSIP includes various additional information for digital broadcasting according to the North America Advanced Television System Committee (ATSC) Standard. The PSIP is information as to services for classification of information to be transmitted to transmission channels and program guide.

Of course, when the broadcast signal received by the demultiplexer 103 meets the European digital video broadcasting (DVB) Standard, the data for data broadcasting may include information according to the DVB-service information (DVB-SI) Standard forming the basis of an electronic program guide (EPG), in place of PSIP, so as to be applied to the European DVB Standard.

The AV stream output from the demultiplexer 103 is sent to the hard disk 109 under the control of the controller 110, so as to be stored (or recorded).

The memory 108 is a non-volatile memory. In the memory 108, various data for data broadcasting including the PSIP separated by the demultiplexer 103 is temporarily stored, in order to be subsequently used in a control operation of the controller 110.

The AV signal processor 104 processes the output video and audio signals, and outputs the resultant signals to the display 105.

The AV signal processor 104 generates a graphic image signal for displaying information for user interface such as broadcasting media, channels, recording, reserved-recording, and playback, in the form of graphics, under the control of the controller 110. The graphic image signal may include an image signal having at least one of text, graphic, and image forms. The graphic image signal may be an on-screen display (OSD) signal. The AV signal processor 104 inserts the graphic image signal, for example, the OSD signal, into the signal obtained in accordance with the processing of the AV signal processor 104, and outputs the resultant signal.

The user interface 113 receives, from the user, a channel change command, a recording command, a reserved-recording command, a playback command for a stored broadcast signal, and a display/change command for various setting items, and outputs the received commands to the controller 110. Using the user interface 113, the user can input a control command for requesting recording or reserved-recording of a broadcast signal corresponding to a broadcast program of a specific broadcasting station. The user can also input a playback command for requesting playback of a recorded broadcast signal.

The user interface 113 may be a wired or wireless interface such as an external wireless remote controller, a mouse, or a keyboard. In accordance with an embodiment of the present invention, a mouse, a keyboard, and etc. may be mounted to the user interface 113 so that they are included in the user interface 113.

The storage medium may include the hard disk 109, the flash memory 108, etc.

The controller 110 controls the overall operation of the broadcast receiver. Also, the controller 110 includes the recording processor 110-1, to perform a function for displaying information as to a new record.

The recording processor 110-1 receives a user's control command as to recording or reserved-recording from the user interface 113, and performs an operation associated with the received control command.

In response to a recording command, the recording processor 110-1 controls a recording operation by performing a control operation to store portions of the AV stream and data for data broadcasting output from the demultiplexer 103, corresponding to the recording command, in the hard disk 109. Here, the portion of the data for data broadcasting stored in the hard disk 109 is information needed for decoding and display of the corresponding AV stream.

Upon receiving a record list display command from the ser via the user interface 113, the recording processor 110-1 outputs a list of the records stored in the storage medium 113 to the video decoder 104, in order to cause the record list to be displayed through the display 105.

When a record is newly registered to the record list in accordance with completion of a recording or reserved-recording operation for the record, the recording processor 110-1 creates a message as to the addition of the new record (hereinafter, referred to as a "new-addition message"), and displays the message via the video decoder 104, to inform the user of the message. Of course, the recording processor 110-1 executes the display of the new-addition message when the main power of the broadcast receiver is re-turned on from an OFF state.

Thus, when a new record is stored in accordance with a reserved-recording operation carried out in an OFF state of the main power of the broadcast receiver (namely, a standby power state), the recording processor 110-1 can inform the user of the presence of the new record, immediately after the main power of the broadcast receiver is re-turned on. Also, when a recording operation begins in an ON state of the main power in response to an immediate-recording command, and is completed after being continued even in a subsequent OFF state of the main power, the recording processor 110-1 can inform the user of the presence of a new record when the main power of the broadcast receiver is re-turned on.

After displaying the new-addition message associated with the new record through the display when the main power of the broadcast receiver is turned on, the recording processor 110-1 does not subsequently display the new-addition message in association with the new record, irrespective of whether or not the user has confirmed the record list. The recording processor 110-1 may also control the new-addition message to be displayed only for a predetermined time (for example, 30 seconds).

Exceptionally, when a new record is registered to the record list in accordance with completion of the associated recording operation in an ON state of the main power, and the user subsequently retrieves the record list before the main power of the broadcast receiver is re-turned off, the recording processor 110-1 do not subsequently display the new-addition message in association with the new record, even when the main power of the broadcast receiver is re-turned on.

On the other hand, when a recording operation is completed during an operation of displaying the record list in response to a record list display command received from the user, the recording processor 110-1 additionally displays the associated record on the record list such that the user can recognize the record as a new record. In this case, no additional new-addition message associated with the new record may be displayed.

In order to execute the above-described operations, the recording processor 110-1 sets a predetermined flag (hereinafter, referred to as a "new-record flag") when a new record is registered to the record list in accordance with a recording or reserved-recording operation. Accordingly, the recording processor 110-1 can determine whether or not the new-addition message should be displayed, by identifying the new-record flag. Also, the recording processor 110-1 resets the new-record flag when the user already confirmed the record list or when the new-addition message associated with the new record was already displayed, in order to prevent the new-addition message from being displayed in the exceptional case.

The new-addition message may be displayed in various forms. It is preferred that the new-addition message have the form of a message window. An example of the new-addition message in the form of a message window is illustrated in FIG. 7.

Figures 7, 8:
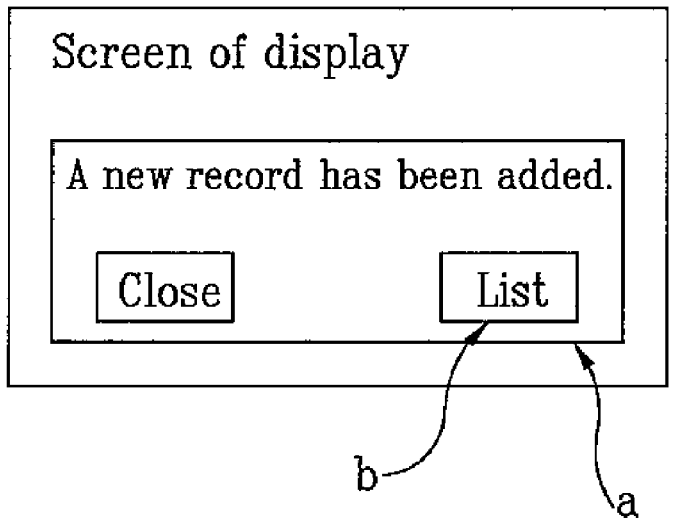
FIG. 7 is a schematic view illustrating an example of a new-addition message which can be displayed upon addition of a new record in accordance with the present invention.
FIG. 8 is a schematic view illustrating a list of new records in a system-initialized state of the broadcast receiver in accordance with an embodiment of the present invention.

Referring to FIG. 7, a new-addition message window a is displayed on the display 105 of FIG. 6. On the message window a, a message informing of addition of a new record is displayed. A "list" button b is also displayed on the message window a, in order to enable a control operation to display the list of new records. The user can cause the broadcast receiver of FIG. 6 to display the list of new records stored in the hard disk 109 in the current state by selecting the "list" button b.

For the new-addition message as shown in FIG. 7, a graphic image previously created and stored may be used.

In accordance with an exemplary embodiment, the record list message may include information as to the new record stored in the hard disc 109. The information as to the record may include the file name of the record, the broadcasting station name of the record, the recording data and time of the record, and information as to whether the record is associated with immediate-recording or reserved-recording. Such information can be identified based on additional information such as PSIP. In this case, the new-addition message should be separately created every time a new record is stored.

FIG. 8 is a schematic view illustrating a list of new records in a system-initialized state of the broadcast receiver in accordance with an embodiment of the present invention.

When a drive signal associated with the "list" button b of the new-addition message as shown in FIG. 7 is generated, the new-record list is displayed. In this case, the new-record list may indicate the storage space in which records are stored. For example, where the broadcast receiver includes a built-in storage and is connected to an external storage via the peripheral-appliance-connecting interface, the broadcast receiver displays storage spaces stored with respective records.

The new-record list may be output for the remaining storage capacity thereof in accordance with the comparison of the total storage capacity of records with the total storage capacity of the storage space.

The new record list includes information as to at least one record. When all new records stored cannot be simultaneously output via the user interface, they may be outputted in the unit of page. The change of one page to another page can be achieved using a page change key or a scroll bar.

The new-record list includes record cells each indicating information as to at least one of records. Hereinafter, information contained in each record cell will be described.

Each record cell contains information for identifying an associated record. The record identifying information may include program title information or storage time domain information, image information, and playback state information. Of course, the record identifying information may include all information capable of identifying records without being limited to the above-described information.

Each record cell may include an image information area. Image information, which is output, may be information received or created upon storing the associated image. The image information may be a still or moving image of the associated record or a still image of the associated record for slide show. The image information may display a thumbnail image that is a specific frame of a video displayed in a size smaller than the original size thereof. Hereinafter, a method for creating a thumbnail image of mobile service data will be described in detail.

Each cell of the new-record list may contain recording time information. The recording time information indicates a recording time. The recording time may be indicated with at least one of date and time.

Each cell of the new-record list may contain recording capacity information. The recording capacity may be indicated with a capacity unit or recording term.

Each cell of the new-record list may also contain program detail information. The program detail information is stored together with information of a program received, when the program is recorded. They can be simultaneously output from the associated record cell. In this case, the program detail information may be output to the same area as the record cell or may be output to an area different from the record cell. For example, when the record cell is highlighted, it is possible to output the program detail information to a pop-up window or to output a window of the program detail information to a separate area under the condition in which outputting of the record list is cut off.

The new-record list may contain menu function keys enabling inputting of various commands associated with playback, editing, etc. of each record.

The menu function may include a playback function such as first playback or previous playback, an editing function such as "select all", "select part", or name change, a moving function, a copying function, and a program detail information outputting function.

Hereinafter, a thumbnail image creating method will be described in detail.

A thumbnail image is used to provide functions effective in a video browser, etc., such as content summary, storyboard, keyframe creation, and program guide. The thumbnail image may be output in a state of being contained in a record cell of the record list described in conjunction with FIG. 8.

The thumbnail image is an image that is a specific frame of a video displayed in a size smaller than the original size thereof. The application of such a thumbnail image is diverse in that the thumbnail image can be used as a small picture summarizing the content of a recorded program, a keyframe created for video indexing, or a representative image in a program guide.

The thumbnail image creating method can be divided into a method in which a frame of a video encoded in an MPEG scheme is decoded, and the decoded frame is directly reduced in size, and a method in which the DC value of an I-picture is used. In the former case, it is necessary to decode all pixels of the frame. For this reason, a variable-length decoder is needed.

In the latter case, no variable-length decoder is needed because a thumbnail image is created using the DC value of an I-picture. The latter method is also simple.

The thumbnail image provides a method for implicatively representing the overall content of a video or the content of a specific portion of the video, using a representative image with a size smaller than the original image, namely, a lower resolution. Accordingly, it is preferred that, for the video frame, which is the source of the thumbnail image, no indistinct image formed due to blur or the like caused by camera movement, for example, abrupt zooming, or object movement, be used because the thumbnail image should not have noise, blank and overlap caused by scene transition or shot transition, and should clearly provide information for the overall portion of the associated video or a specific portion of the associated video.

If thumbnail images are created for all I-pictures of a video, the quantity of the created thumbnail images is huge. In this case, accordingly, the burden of the storage medium increases. Also, there is inconvenience in searching for the content desired by the user because many unnecessary thumbnail images intervene. Furthermore, since the number of thumbnail images that can be displayed on one screen is limitative, it may be difficult to effectively implicatively represent the content of the overall video portion or the content of a specific video portion.

In order to solve such problems, a method, in which thumbnail images are created at regular intervals in accordance with a predetermined sampling rate or a sampling rate input by the user, may be used.

Another method, in which the user designates portions of a video for creation of thumbnail images, may be used.

That is, creation of thumbnail images based on I-pictures may be achieved by unconditionally creating a thumbnail image for every I-picture, creating thumbnail images at regular intervals in accordance with a designated sampling rate, or creating thumbnail images at intervals designated by the user.

Figure 9:
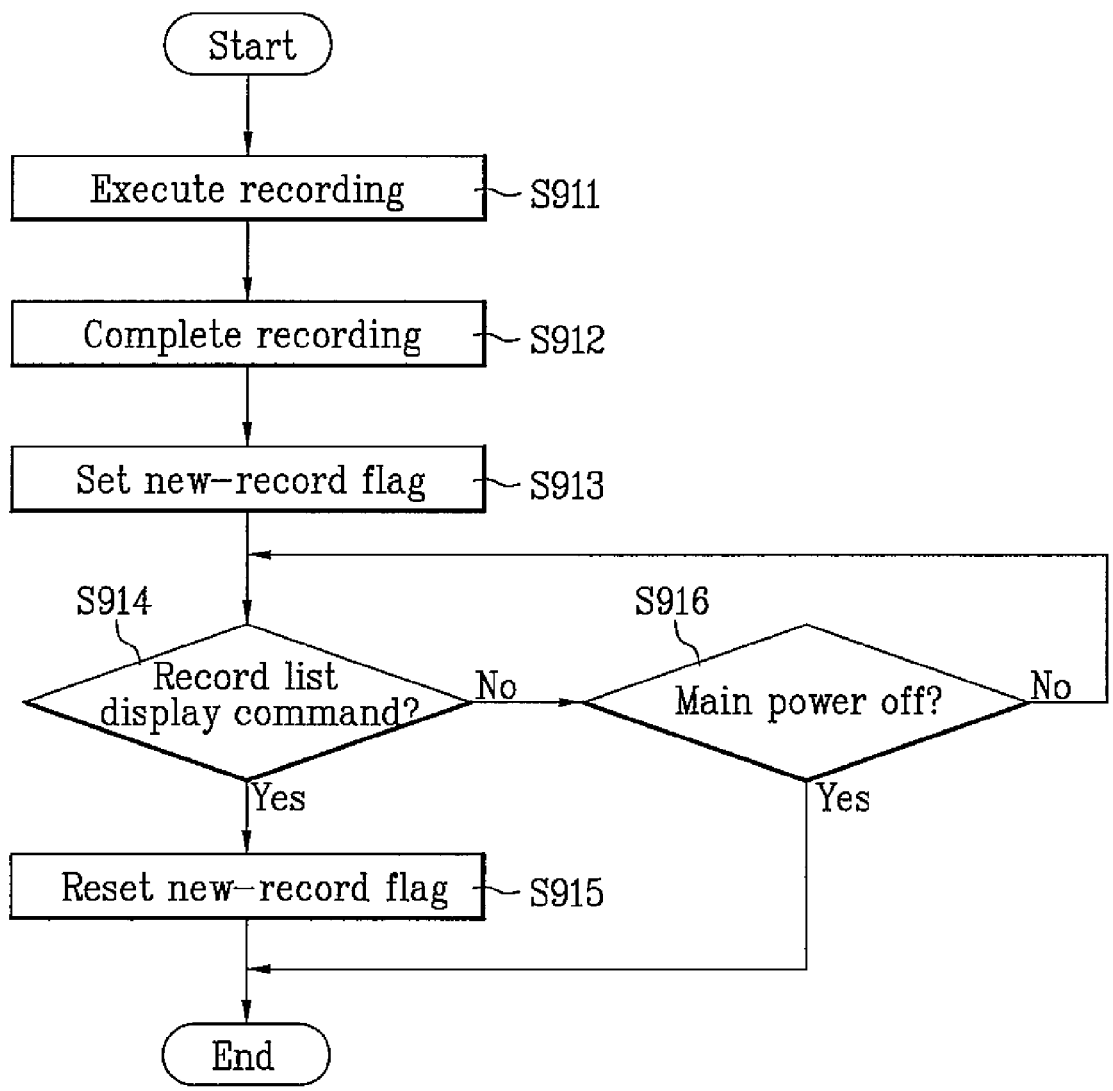
FIG. 9 is a flow chart illustrating a method for performing a recording operation and generating a new-record flag in accordance with an embodiment of the present invention.

FIG. 9 is a flow chart illustrating a method for performing a recording operation and generating a new-record flag in accordance with an embodiment of the present invention.

Hereinafter, a method for setting a new-addition flag by the recording processor 110-1 of FIG. 6 when a record is generated. When the recording processor 110-1 performs a recording operation or a reserved-recording operation in accordance with a control command from the user (S911), and then completes the recording operation (S912), the recording processor 110-1 sets a new-addition flag (S913).

Subsequently, the recording processor 115-1 identifies whether or not there is a record list display command received through the user interface 113 of FIG. 6 (s914). When there is a record list display command, the recording processor 115-1 resets the new-addition flag for the displayed record list, in order to prevent the new-addition message from being displayed (S915).

When it is determined at step S914 that there is no record list display command, the recording processor 110-1 of FIG. 6 repeatedly executes step S913 until the main power is turned off (S916).

In accordance with the above-described method, the recording processor 110-1 repeats a preparation for displaying the new-addition message.

Figure 10:
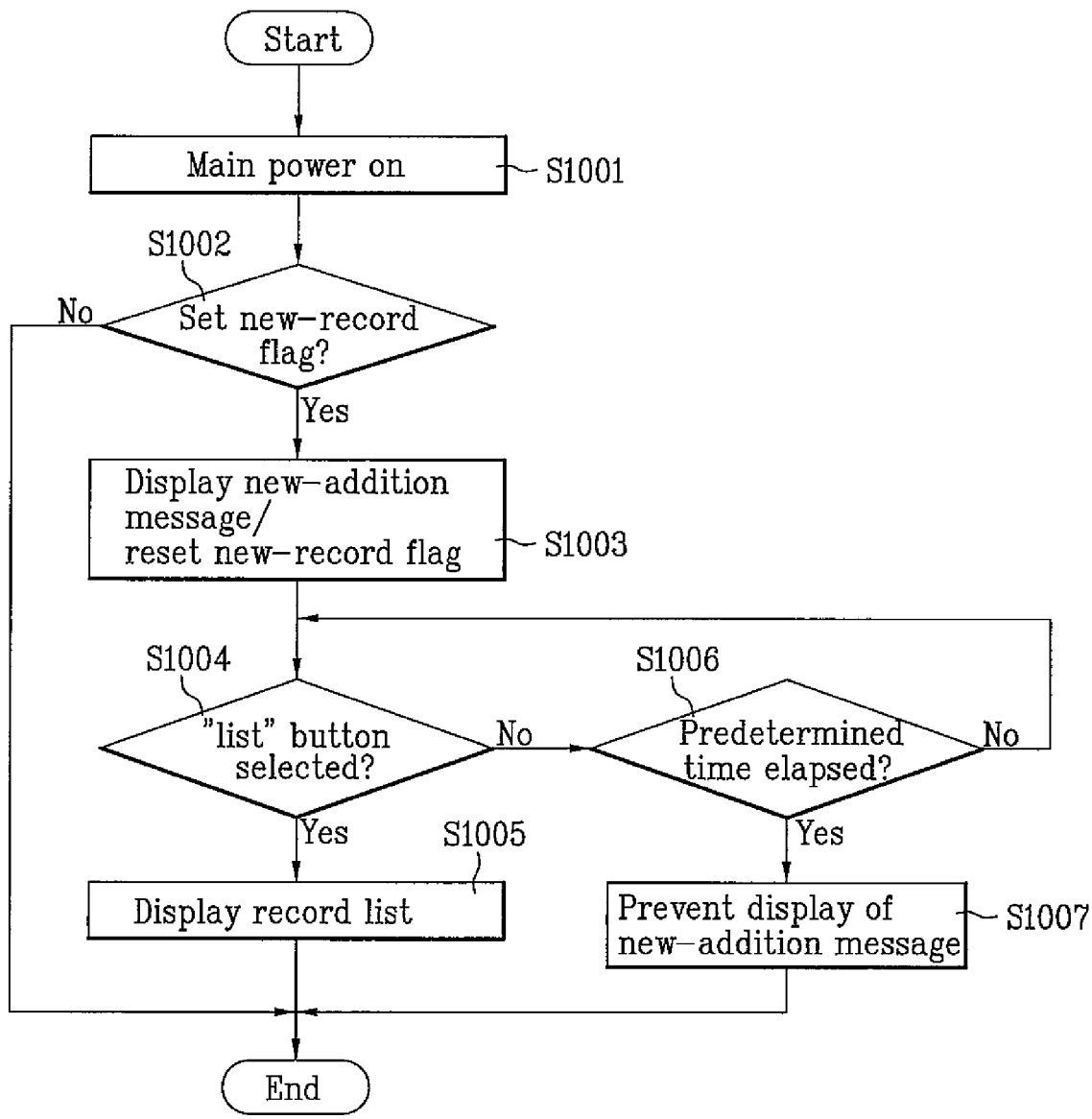
FIG. 10 is a flow chart illustrating a method for displaying a new record in the broadcast receive in accordance with an embodiment of the present invention.

FIG. 10 is a flow chart illustrating a method for displaying a new record in the broadcast receive in accordance with an embodiment of the present invention.

Hereinafter, a method for displaying a new-addition message, using a new-record flag will be described. When the broadcast receiver completes an initial procedure for execution of a normal operation, after the main power is turned on (S1001), the recording processor 110-1 of FIG. 6 searches for a set new-record flag (S1002).

When there is a set new-record flag, the recording processor 110-1 of FIG. 6 outputs, to the video decoder 104, a new-addition message as shown in FIG. 7, such that the new-addition message is displayed on the display 105. When the record is played back, the recording processor 110-1 resets the new-record flag (S1003).

The new-addition message displayed at step S1003 may be obtained by extracting a message previously created and stored from the hard disk 109 or memory 108, in which the associated record is stored, or by newly creating a message including various information as to the associated record.

*The recording processor 110-1 of FIG. 6 determines whether or not the "list" button b on the new-addition message of FIG. 7 has been selected by the user (s1004). When the "list" button b has been selected, the recording processor 110-1 outputs the record list to the video decoder 104 such that the record list is displayed on the display 105 (S1005).

The recording processor 110-1 of FIG. 6 checks whether or not the "list" button b is selected, for a predetermined time after the display of the new-addition message. When there is no selection of the "list" button b, the recording processor 110-1 no longer displays the new-addition message (S1007).

In accordance with the above-described method, the broadcast receiver of the present invention can display additional storage of a new record, to allow the user to recognize the additional storage of the new record.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the general digital broadcast receiver DVR, which has been conventionally used, has a function to inform the user of recorded image objects in the form of a list, there is a problem in that, when the user utilizes a reserved-recording function or does not view a record immediately after the completion of the recording operation associated with the record, the identification of the record by the user should be carried out using operation of a remote controller. For this reason, the user cannot easily recognize the presence of the new record. Furthermore, there is inconvenience because the user should access the record file list through a menu.

However, in accordance with the present invention, the execution/non-execution file descriptors of record files are searched upon system initialization of the broadcast receiver. When there is a new record or a record not played back, a record file alarming message is output in a state of being overlaid on a broadcast signal received. Accordingly, the user can access the record file list simultaneously with viewing a broadcast, without using any additional means.

The invention claimed is:

1. A method for displaying an alarming message in a record displaying apparatus, comprising:
   detecting a power supply signal input;
   searching execution/non-execution file descriptors of recorded multimedia files in response to detecting the power supply signal input, and detecting at least one of the execution/non-execution file descriptors, each of the at least one of the execution/non-execution file descriptors having one of a first value and a second value, the first value indicating a presence of a new record file;
   automatically outputting a record file alarming message in response to detecting the at least one of the execution/non-execution file descriptors; and
   determining whether or not a record list display command is received in a state where the record file alarming message is displayed,
   wherein, when the record list display command is not received, the record file alarming message is displayed only for a predetermined time, and when the record list display command is received, a list including all record files corresponding to the at least one of the execution/non-execution file descriptors is displayed, and all occurrences of the first value are changed to the second value,
   wherein the list includes a plurality of record cells of which corresponds to the record files respectively and each of the record cells comprises a thumbnail image, recording time information and playback state information associated record file, and
   wherein the thumbnail image, the recording time information and the playback state information are displayed together on a screen of a display of the record displaying apparatus.

2. The method according to claim 1, wherein the second value indicates a presence of a pre-existing record file that has not been played back.

3. The method according to claim 1, wherein each of the execution/non-execution file descriptors is a record file extension inserted upon recording the associated multimedia file.

4. The method according to claim 1, wherein the record files displayed in the list are displayed in ascending time order.

5. The method according to claim 1, further comprising:
   upon playing a record file corresponding to the at least one of the execution/non-execution file descriptors, changing the one of the first value and the second value of the played record file to a value indicating that the played record file has been played.

6. The method according to claim 1, wherein the recorded multimedia files are video and audio data.

7. The method according to claim 1, wherein the recorded multimedia files are broadcast signal stream information.

8. The method according to claim 1, further comprising:
   stopping outputting of the record file alarming message when a predetermined control signal is input during the automatically outputting of the record file alarming message.

9. The method according to claim 1, wherein the record file alarming message contains information about a record file corresponding to the at least one of the execution/non-execution file descriptors.

10. The method according to claim 9, wherein the information about the record file includes a file name of the record file, a broadcasting station name of the record file, and information as to whether the record file is associated with immediate-recording or reserved-recording.

11. A record displaying apparatus, comprising:
   a user interface;
   a storage;
   a display; and
   a controller operatively connected to the user interface, the storage and the display, the controller configured to
   detect a power supply signal input to the record displaying apparatus,
   search execution/non-execution file descriptors of recorded multimedia files in response to detecting the power supply signal input, and detect at least one of the execution/non-execution file descriptors, each of the at least one of the execution/non-execution file descriptors having one of a first value and a second value, the first value indicating a presence of a new record file,
   automatically output a record file alarming message in response to detecting the at least one of the execution/non-execution file descriptors, and
   determine whether or not a record list display command is received in a state where the record file alarming message is displayed,
   wherein, when the record list display command is not received, the controller is configured to display the record file alarming message only for a predetermined time on the display, and when the record list display command is received, the controller is configured to display a list including all record files corresponding to the at least one of the execution/non-execution file descriptors, and to change all occurrences of the first value to the second value, wherein the list includes a plurality of record cells of which corresponds to the record files respectively, and each of the record cells comprises a thumbnail image, recording time information and playback state information of associated record file, and wherein the thumbnail image, the recording time information and the playback state information are displayed together on a screen of the display.

12. The record displaying apparatus according to claim 11, wherein the second value indicates a presence of a pre-existing record file that has not been played back.

13. The record displaying apparatus according to claim 11, wherein the record file alarming message includes an icon function for execution of a direct access to the list.

14. The record displaying apparatus according to claim 11, wherein, upon playing a record file corresponding to the at least one of the execution/non-execution file descriptors, the controller is further configured to change the one of the first value and the second value of the played record file to a value indicating that the played record file has been played.

15. The record displaying apparatus according to claim 11, wherein the controller is further configured to create the execution/non-execution file descriptors and the list.

16. The record displaying apparatus according to claim 15, wherein the record file alarming message includes a lower item of information of the list.

17. The record displaying apparatus according to claim 15, wherein the user interface provides editing and deletion functions for the list in a state of being linked to the record file alarming message.

* * * * *